March 13, 1934. G. CASTELLÓ 1,950,481
METHOD FOR THE PROJECTION OF CINEMATOGRAPH PICTURES WHICH GIVE THE
SENSATION OF A TRIP IN AN AEROPLANE OR AIRSHIP
Filed Oct. 31, 1932
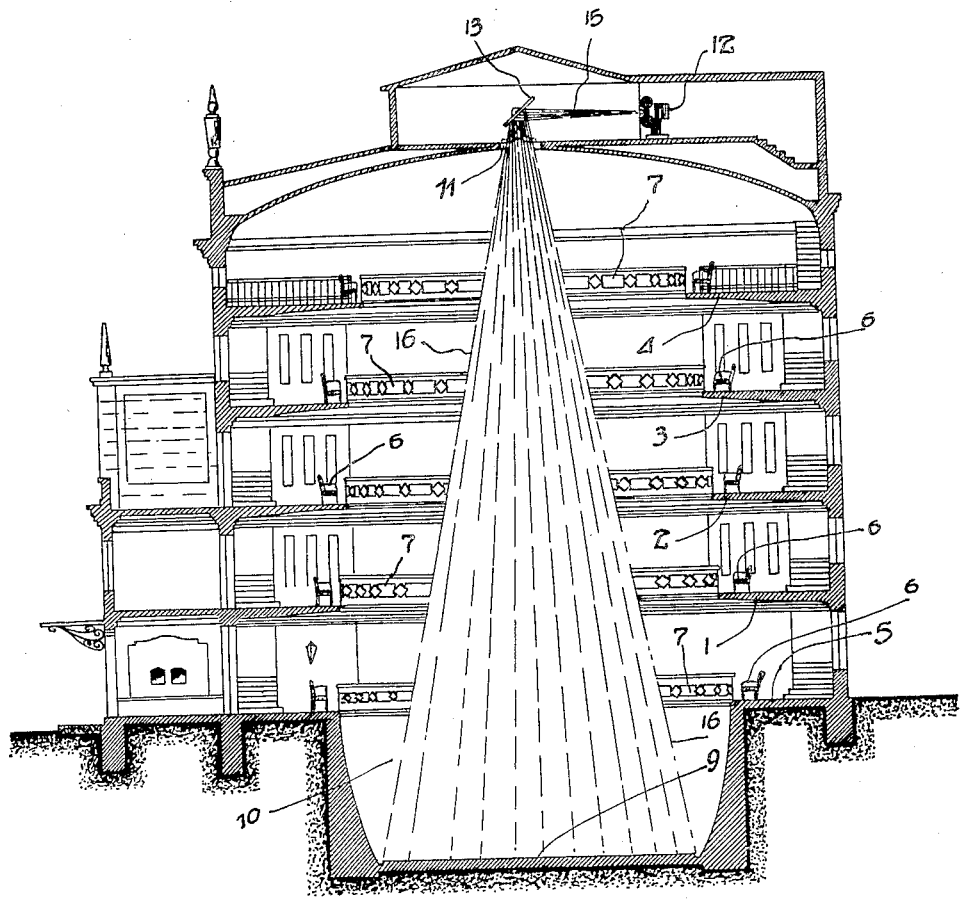
GERÓNIMO CASTELLÓ
INVENTOR
BY *Haseltine, Lake & Co.,*
ATTORNEYS Patented Mar. 13, 1934

1,950,481

UNITED STATES PATENT OFFICE 1,950,481

METHOD FOR THE PROJECTION OF CINEMATOGRAPH PICTURES WHICH GIVE THE SENSATION OF A TRIP IN AN AEROPLANE OR AIRSHIP

Gerónimo Castelló, Barcelona, Spain

Application October 31, 1932, Serial No. 640,480
In Spain November 4, 1931

2 Claims. (Cl. 88—24)

My invention refers to a method for projecting cinematograph pictures taken vertically from an airship or aeroplane, through which the panoramas projected upon the screen appear to the eyes of the spectator as if they were really seen from the aeroplane or airship and giving him the impression of aerial trip.

With all the advances and improvements which have constantly been introduced in the cinematographic art, up to now they have not been able to prevent the bad effect produced on the spectator by the projection of films representing panoramic scenes taken from an aeroplane or airship. This is due in part to the fact that the projection screen is vertically situated and therefore the spectator does not see the panorama projected in the same way as it has been photographed, as is psychologically necessary in order to give the sensation of reality.

For these reasons, it has not been possible up to now in the exhibition and projection of these films taken and projected by the usual methods, to obtain the effect and sensation of reality which has been obtained in films taken in an approximately horizontal direction, which are those usual in cinematography, as in these latter the spectator sees them projected also in the horizontal direction.

With the method of my invention, it is possible to present to the spectator the projection of pictures taken from an airship or aeroplane, in such a form that they appear before his eyes in approximately the same direction in which they have been taken, that is, in a vertical direction, and the spectator on contemplating them has the same bird's eye view as if he were transported to the aeroplane or airship used to take the film.

The method consists in projecting the film vertically, either directly or by reflection, from a point situated in the centre and from a high part of the building used for these projections, to a screen placed horizontally in the lower part of same or preferably in a pit in this and to accommodate the spectators around the cone of light projected, distributed in rows situated at different heights so that they can all see comfortably and without inconvenience the film being projected.

In order to avoid any oscillation of the images reproduced on the screen, caused, as has been previously stated by the movement of the aeroplane or airship, there is employed in this system of projections, films taken by a camera provided with a universal-joint suspension of any appropriate type in order that the apparatus may maintain the optical axis in a vertical direction.

The projection may be made directly from the lens of the projecting apparatus or by reflection through a mirror or prism.

In the attached drawing there is shown as an example, in a vertical section, a theatre, appropriate for the showing of panoramic cinematograph pictures according to this invention.

The hall or theatre, shown as an example, occupies the whole of the interior of a building forming a central court, with circular galleries arranged on different floors 1, 2, 3, 4 of the building. In the front of these galleries, as well as on the floor 5 of the building, there are, behind the corresponding balconies 7 rows of stalls 6 which allow seating accommodation for a large number of spectators. These galleries are arranged in such a manner that the floor of every one of them projects out from the floor of the next lower one, sufficient distance to allow all the spectators to see the screen without obstructing one another's view in any way of the screen 9 which is placed horizontally in the bottom of a pit 10 situated in the centre of the lowest floor 5 with the object that the screen shall be a sufficient distance from the spectators on the lower floor. On this screen there is projected vertically the film through a small aperture 11 situated in the centre of the roof.

Projection may be made, as in the example shown, by reflection, combining with a cinematograph apparatus 12 installed in the usual way in the horizontal direction, a mirror 13 inclined at 45 degrees, situated over the aperture 11 of the roof and in such a way that it receives the ray projected horizontally by the apparatus 12 and reflects same downwards and in a vertical direction on the screen. The projection may also be made direct, by pointing in a vertical direction the lantern of the projecting apparatus.

For the necessary protection against fire, the said cinematograph apparatus is situated, as well as the mirror in the inside of an operating room situated in a loft 15 of the building, leaving this completely protected.

The films of panoramic views, projected by this method on the horizontal screen 9 can be seen by the spectators comfortably seated and distributed around the projection cone 16 approximately in the same vertical direction in which the film has been taken and thus obtaining as has been explained, the impression of an aerial trip.

In addition, this method of projection can be applied to a great many applications of cinematography of interest and effect. For example, in what are commonly known as "war films" this system allows a bird's eye view covering a great extension of the field of operations and gives the spectator a perfect idea of combined movements of combatants and incidents of the battle. This method also is very appropriate for following, without losing any detail, all the incidents of a football match or any similar sport, employing in this case films taken by a camera, such as the one mentioned previously, suspended from a relatively fixed point and at a convenient height, such as for example from a small captive balloon.

I claim:—

1. In the method for the cinematographic projection and the substantially vertical viewing of panoramic pictures taken vertically from aircraft, wherein the pictures are projected vertically downward upon a screen horizontally disposed below the level of the spectators viewing the pictures thereon, the step of arranging the positions of the spectators in successively superposed and diametrically decreased single rows surrounding and facing the vertical axis of the screen.

2. In the combination of a cinematographic projector having facilities for projecting panoramic pictures substantially vertically downward and a substantially horizontal screen upon which the pictures may be projected and also seating means for spectators, the feature of providing said seating means in successive superposed and increasingly smaller rows disposed above the screen and at least partially surrounding the vertical axis of the screen so that each spectator faces said axis, and thereby providing for each spectator an unobstructed downward vertical view of the projected pictures upon said screen.

GERÓNIMO CASTELLÓ.